(12) United States Patent
Colella et al.

(10) Patent No.: US 12,360,914 B2
(45) Date of Patent: *Jul. 15, 2025

(54) DYNAMIC UPDATES TO LOGICAL-TO-PHYSICAL ADDRESS TRANSLATION TABLE BITMAPS

(71) Applicant: Micron Technology, Inc., Boise, ID (US)

(72) Inventors: Nicola Colella, Caserta (IT); Antonino Pollio, Vico Equense (IT); Gianfranco Ferrante, Naples (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,758

(22) Filed: Jan. 31, 2024

(65) Prior Publication Data

US 2024/0168889 A1    May 23, 2024

Related U.S. Application Data

(63) Continuation of application No. 17/890,507, filed on Aug. 18, 2022, now Pat. No. 11,928,063.

(51) Int. Cl.
*G06F 12/10* (2016.01)
*G06F 12/02* (2006.01)
*G06F 12/0873* (2016.01)
*G06F 12/1009* (2016.01)

(52) U.S. Cl.
CPC ...... *G06F 12/1009* (2013.01); *G06F 12/0246* (2013.01); *G06F 12/0873* (2013.01)

(58) Field of Classification Search
CPC ............ G06F 12/1009; G06F 12/0246; G06F 12/0873; G06F 2212/7201
USPC .......................................................... 711/206
See application file for complete search history.

(56) References Cited

U.S. PATENT DOCUMENTS 10,732,877 B1 *   8/2020   Gopalakrishnan .......................... G11C 11/5642
2022/0129388 A1    4/2022   Balakrishnan et al.

\* cited by examiner

*Primary Examiner* — Hua J Song
(74) *Attorney, Agent, or Firm* — Lowenstein Sandler LLP

(57) ABSTRACT

A method includes: creating a logical-to-physical address translation (L2P) bitmap for each respective virtual block programmed across a plane of multiple dice of a memory device, each L2P bitmap identifying logical addresses, within each respective L2P table of a plurality of L2P tables, that belong to a respective virtual block; creating a virtual block (VB) bitmap for each respective L2P table, the VB bitmap identifying virtual blocks to which the respective L2P table points; creating an updated VB bitmap for a first L2P table, of the plurality of L2P tables, based on changes to the first L2P table; determining that an entry in the VB bitmap is different than the entry in the updated VB bitmap, the entry corresponding to a particular virtual block; and identifying and updating, by the processing device, an L2P bitmap associated with the particular virtual block for an L2P mapping corresponding to the entry.

20 Claims, 8 Drawing Sheets

DYNAMIC UPDATES TO LOGICAL-TO-PHYSICAL ADDRESS TRANSLATION TABLE BITMAPS

RELATED APPLICATIONS

The present application is a continuation of U.S. patent application Ser. No. 17/890,507, filed Aug. 18, 2022, which is incorporated by reference herein.

TECHNICAL FIELD

Embodiments of the disclosure are generally related to memory sub-systems, and more specifically, relate to perform dynamic updates to logical-to-physical (L2P) address translation table bitmaps.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

DETAILED DESCRIPTION

Figure 1A:
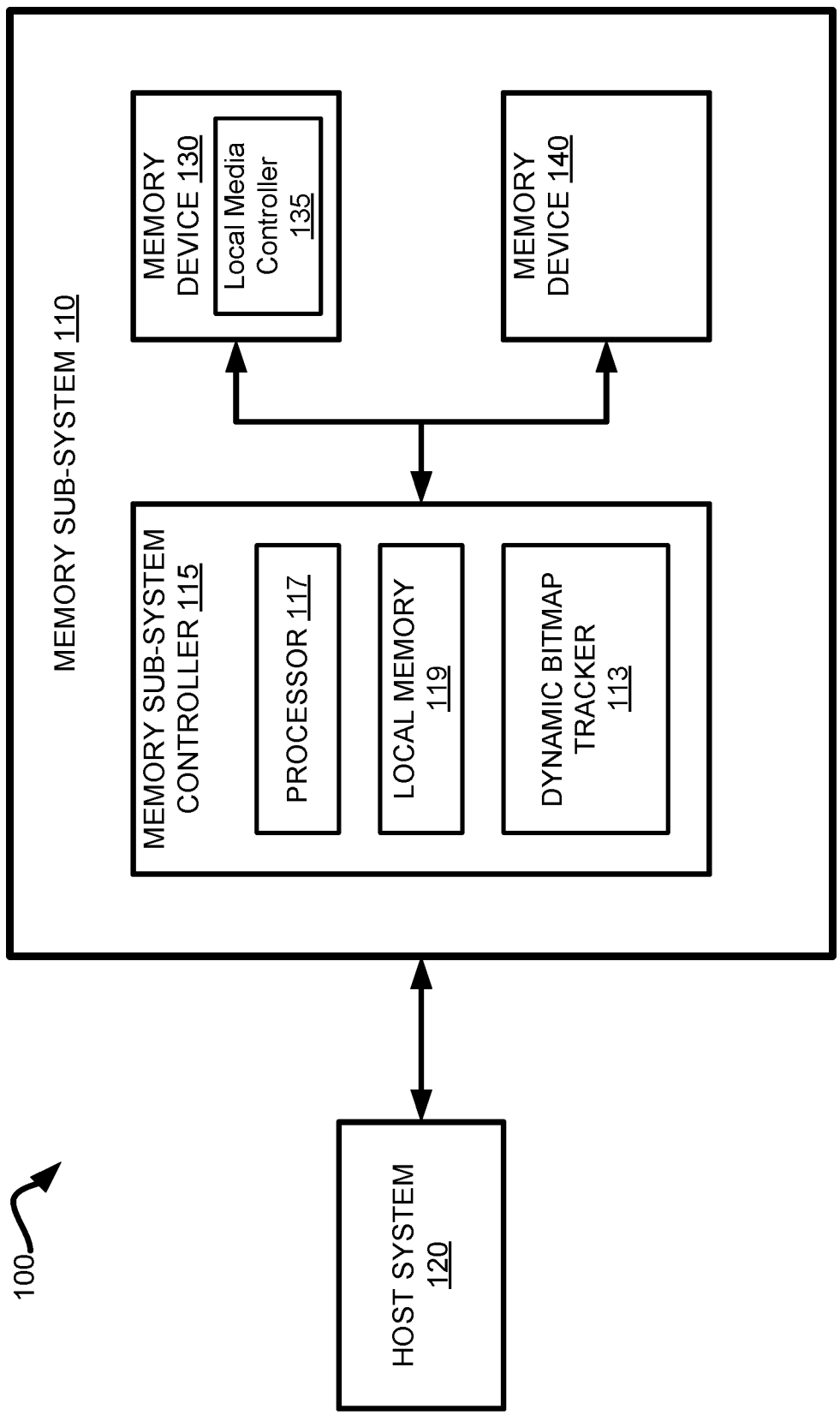
FIG. 1A illustrates an example computing system that includes a memory sub-system in accordance with some embodiments.

Embodiments of the present disclosure are directed to dynamically updating logical-to-physical (L2P) address translation table bitmaps. A memory sub-system can be a storage device, a memory module, or a hybrid of a storage device and memory module, any of which can be referred to generally as a memory device. In some examples, a memory device has multiple channels, each coupled to one or more memory dice. Each die, of these multiple memory dice, is a packaged semiconductor chip capable of storing and retrieving data from pages of memory.

Certain memory sub-systems, also known as managed negative AND (mNAND) devices, include a memory sub-system controller (e.g., processing device) located on the same package as memory components, e.g., NAND dice. The controller can be configured with firmware used to translate host commands sent according to certain protocols, such as Universal Flash Storage (UFC), Embedded Multi-Media Card (eMMC), or other solid-state drive (SSD) technology or protocols discussed with reference to FIG. 1A.

Due to a NAND constraint of programming data by physical page but erasing the data by physical block, the controller maintains a logical-to-physical address translation (L2P) table to which, for each logical block address (e.g., LBA or "logical address") provided by the host, the controller associates (or maps) the address of a physical page where this data is stored. Thus, the L2P tables store mappings of logical addresses to physical addresses of the data stored in the NAND dice. During a write operation, the controller updates the L2P table to track the new physical address of the LBA and invalidates the previous physical address. During a read operation, the controller retrieves, from the L2P table, the valid physical address. During an erase (or UNMAP) operation, the controller invalidates the physical addresses to track that the LBA is not mapped in any physical location.

In a typical memory device, one L2P table covers a limited range of LBAs (typically one L2P table covers a particular range of data stored to the dice). For purposes of explanation and by way of example, a memory device with a logical size of 512 gigabyte (GB) can require L2P tables having a 512 megabyte (MB) total size, and such a large amount of metadata cannot be stored in local volatile memory. The L2P tables, therefore, can be stored in a dedicated NAND virtual block (VB) and a limited number of the L2P tables involved in a current read/write/UNMAP operation are stored to the local volatile memory, e.g., static random access memory (SRAM) or tightly coupled memory (TCM).

A virtual block (VB) can be formed by the union of physical blocks belonging to each plane on different NAND dice located in a particular packaged memory device. For example, if there are four dice, and each die has four planes, the VB can be the union of slices (e.g., physical blocks) across the planes of each of the dice. Thus, in this example, each VB would be the union of 16 physical blocks. Typically, more than one L2P table is needed to track logical-to-physical address mappings for each VB. For example purposes only, one L2P table might cover the L2P translation for a logical area of 4 MB and the controller maintains several updated L2P tables to cover the entire logical size of the packaged memory device.

As the controller proceeds to write data into NAND memory, the controller continues to fill each respective VB and update the L2P table(s) to track which physical pages map to valid logical addresses and which physical pages map to invalid logical addresses. At a certain point, there is no more availability of empty VBs and the controller can perform media management (also called a garbage collection (GC) operation) by which to move valid data from a source VB to a destination VB to free up the source VB. To migrate data during such media management, for example, the controller can identify a source VB with a minimum amount of valid data in order to reclaim as much free space possible. The controller can further locate, within a L2P table for the source VB, which logical addresses are mapped to physical addresses with valid data. The controller can further read the valid data from the source VB and write (or program) this valid data into a destination VB, e.g., which can be a virtual block that still has sufficient availability to store this valid data. The controller can then update (e.g., remap) the L2P table to record the valid logical addresses are now mapped to new physical pages of destination VB.

During the media management process, however, the controller does not know which physical page is valid or not valid. Further, because the L2P tables are likely stored in the dedicated VB on the dice (e.g., the most stale VBs that are likely to be chosen for a GC operation and their corresponding L2P tables are likely not cached in local volatile memory), it would take too much time to search all L2P tables to determine the valid logical addresses for the source VB. More specifically, the L2P tables would have to be consecutively read into the local volatile memory of the controller and searched until all valid logical addresses are found. This searching processes involves so much latency, it would cause unacceptable performance and quality-of-service issues if implemented. Although L2P bitmaps have been employed to track, to some extent, valid logical addresses with the L2P tables represented in the L2P bitmaps, the L2P bitmaps are closed after the corresponding VBs are programmed. Thus, the L2P bitmaps of current memory devices are static and do not track updates to further programming (or erasing) of physical blocks of the dice after closure of the L2P bitmaps, which are then flushed to the dice upon closure.

Aspects of the present disclosure address the above and other deficiencies by employing systems and methods for dynamically-updating one or more L2P bitmaps, which are much smaller and can quickly be accessed, to determine which L2P table(s) contain mappings of the physical pages to the valid logical addresses containing the valid data in the source VB. More specifically, the controller can create a VB bitmap for each respective L2P table, where the VB bitmap identifies VBs to which the respective L2P table points. The VB bitmaps can be updated over time as programming continues and be used to identify which L2P bitmaps to update based on handling of new write operations.

In at least one embodiment, for example, the controller (e.g., processing device) performs a number of operations to carry out the updates to the L2P tables. As discussed, the controller can cause programming of virtual blocks across planes of the multiple dice. The controller can create L2P tables to track physical address locations to which logical addresses are mapped. The controller can create an L2P bitmap for a respective virtual block, the L2P bitmap identifying logical addresses, within each respective L2P table, that belong to the respective virtual block. The controller can create a virtual block (VB) bitmap for each respective L2P table, the VB bitmap identifying virtual blocks to which the respective L2P table points. The controller can create an updated VB bitmap for a particular L2P table based on changes to the particular L2P table due to programming the virtual blocks after closing the particular L2P table. The controller can determine that an entry in the VB bitmap is different than the entry in the updated VB bitmap, the entry corresponding to a particular virtual block, for example. The controller can then identify an L2P bitmap corresponding to the particular virtual block. The controller can change a bit within the identified L2P bitmap for an L2P mapping corresponding to the entry. The controller can determine, based on the identified L2P bitmap, one or more L2P tables of the respective L2P tables that contain valid logical addresses for the particular virtual block.

Therefore, advantages of the systems and methods implemented in accordance with some embodiments of the present disclosure include, but are not limited to, dynamically updating L2P and VB bitmaps in order to quickly identify the L2P table(s) that contain valid logical addresses for data that is being transferred from a source VB to a destination VB during media management (e.g., GC operations). By dynamically performing these bitmap updates, the controller avoids serially reading L2P tables from one or more dice (e.g., non-volatile memory) into local cache memory (e.g., SRAM, TCM) and searching the L2P tables one by one in order to determine the logical addresses that are mapped to valid data. Other advantages will be apparent to those skilled in the art of media management within a memory sub-system discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. A non-volatile memory device is a package of one or more dice. Each die can include one or more planes. Planes can be groups into logic units (LUN). For some types of non-volatile memory devices (e.g., NAND devices), each plane include a set of physical blocks. A "block" herein refers to a set of contiguous or non-contiguous memory pages. An example of a block is an erasable block, which is a minimal erasable unit of memory, while a page is a minimal writable unit of memory. Each page includes a set of memory cells ("cells"). A cell is an electronic circuit that stores information.

Data operations can be performed by the memory sub-system. The data operations can be host-initiated operations, e.g., initiated by a host system 120. For example, the host system 120 can initiate a data operation (e.g., write, read, erase, etc.) on a memory sub-system. The host system 120 can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system 120 associates with the host data. In some examples, host data includes user data stored for a user or application of the memory device.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

In at least some embodiments, the memory sub-system 110 includes a dynamic bitmap tracker 113 that can update VB bitmaps in order to discover which L2P bitmaps are to be updated and to update those L2P bitmaps during programming performed to the VBs subsequent to initial closure of the L2P bitmaps. In some embodiments, the memory sub-system controller 115 includes at least a portion of the dynamic bitmap tracker 113. In some embodiments, the dynamic bitmap tracker 113 is part of the host system 110, an application, or an operating system. In other embodiments, the local media controller 135 includes at least a portion of dynamic bitmap tracker 113 and is configured to perform the functionality described herein.

Figure 1B:
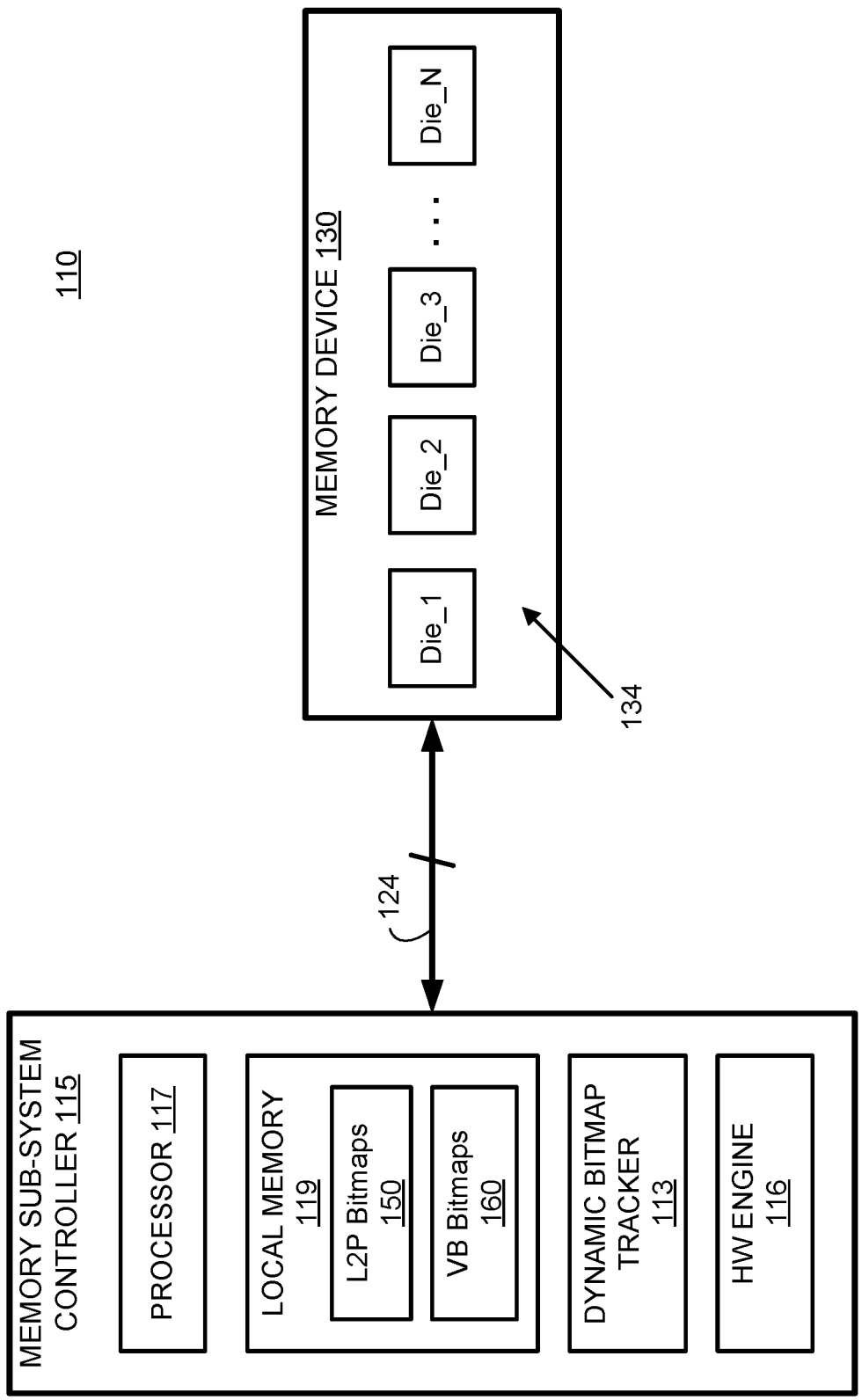
FIG. 1B illustrates the example memory sub-system of FIG. 1A in which the memory device includes multiple memory dice and multiple channels, in accordance with some embodiments.

FIG. 1B illustrates the example memory sub-system 110 of FIG. 1A in which the memory device 130 includes multiple memory dice 134 and multiple channels 124, in accordance with some embodiments. In these embodiments, the multiple channels 124 couple the memory sub-system controller 115 to the multiple memory dice 134 of the memory device 130. For example, each channel of the multiple channels 124 can couple the controller 115 to one or more memory dice of the multiple memory dice 134 over which to carry out read, write, and erase (or UNMAP) operations. In various embodiments, the local memory 119 is fast-access volatile memory such as SRAM or TCM. The controller 115 (e.g., the dynamic bitmap tracker 113) can store L2P bitmaps 150 and VB bitmaps 160 to the local memory 119.

In at least some embodiments, the controller 115 further includes a hardware engine 116 (or hardware logic) configured to extract VB-based information related to mappings of the virtual blocks to specific L2P tables, the VB-based information facilitating the creation of the VB bitmap and the updated VB bitmap. In some embodiments, the hardware engine 116 is a comparator that generates information that is searchable, e.g., VB number(s) and whether the VB is mapped through a particular L2P table.

Figure 1C:
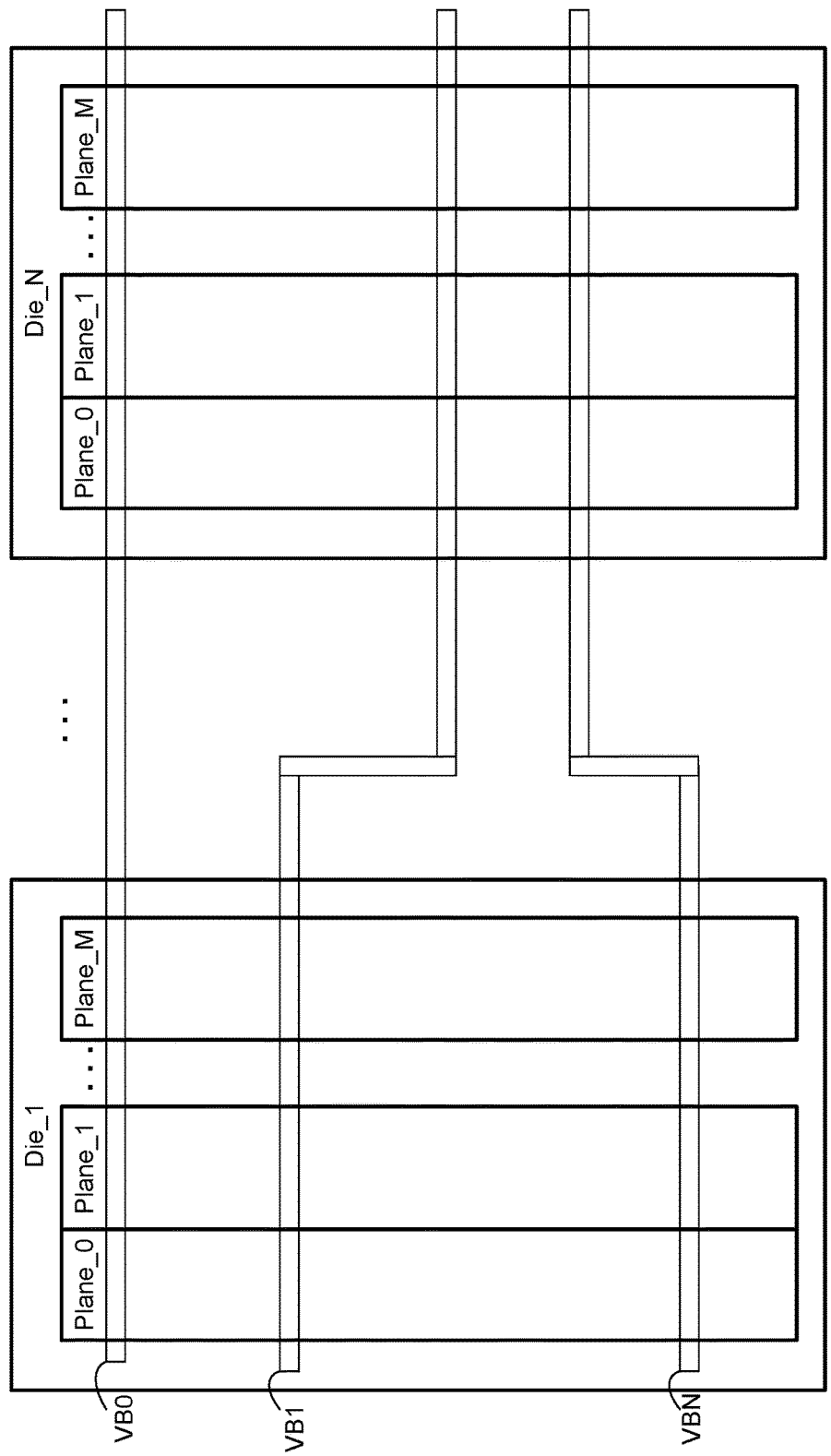
FIG. 1C illustrates an example of virtual blocks (VBs) formed within multiple planes of the multiple memory dice, in accordance to at least one embodiment.

FIG. 1C illustrates an example of virtual blocks (VBs) formed within multiple planes of the multiple memory dice, in accordance to at least one embodiment. As discussed, a virtual block (VB) can be understood to be formed by the union of physical blocks belonging to different NAND dice (e.g., Die_1, Die_2, Die_3 . . . Die_N) located in a particular packaged memory device. For example, if there are N dice, as illustrated, and each die has four planes, the VB is the union of slices (e.g., physical blocks) across each plane of each of the dice.

In at least one exemplary embodiment for purposes of explanation, a first virtual block (VB0) may be a combination of a first physical block of each plane (PL0, PL1, . . . PLM) across all N dice. Further by way of example, a second virtual block (VB1) may be a combination of, e.g., a tenth physical block of each plane (PL0, PL1, . . . PLM) of Die_1 (and potentially additional dice) and, e.g. a twentieth physical block of each plane of Die_N (and potentially additional dice). As another example, an Nth virtual block (VBN) may be a combination of an Nth physical block of each plane (PL0, PL1, . . . PLM) of Die_1 (and potentially additional dice) and, e.g., an N−1th block of each plane of Die_N (and potentially additional dice). In this way, virtual blocks may be formed in many different ways as different physical block cross sections through the same planes of each respective die of the multiple dice. So, for example, if there are four planes within each die and there are four dice, then there will be 16 physical blocks within each virtual block. More than one L2P table is typically needed to track L2P address mappings for each VB. For example purposes only, one L2P table might cover the L2P translation for a logical area of 4 MB and the controller maintains several updated L2P tables to cover the entire logical size of the packaged memory device, e.g., that includes Die_1 . . . Die_N.

With additional reference to FIG. 1B, an L2P bitmap (of the L2P bitmaps 150) may be understood to be a mask of bits for each VB. This mask of bits may identify which entries in L2P tables point to the virtual pages (identified by logical address) that belong to a current VB to which the controller 115 is writing. The controller 115 may update the L2P bitmap in the local memory 119 each time the controller 115 performs an update to an L2P table (e.g., also referred to as a checkpoint procedure). The L2P bitmap, at the conclusion of such updates to corresponding L2P tables, may be stored (e.g. flushed) to a particular VB in one or more of the multiple dice 134. This particular VB may be the VB used for storing the L2P tables (TABLE_VB) or another VB.

TABLE 1

| L2P_N | L2P_N-1 | ... | ... | L2P_2 | L2P_1 | L2P_0 |
|---|---|---|---|---|---|---|
| 0 | 0 | ... | ... | 1 | 0 | 1 |

An example of an L2P bitmap is illustrated in Table 1, where each entry represents a sequentially-numbered L2P table (e.g., L2P_0, L2P_1, L2P_2, ... L2P_N−1, L2P_N). Each entry is either a zero ("0") bit value or a one ("1") bit value, where a one bit value indicates that the particular L2P table is mapped into the selected VB and a zero bit value indicates that the particular L2P table is not mapped into the selected VB. For purposes of explanation, suppose the memory device 130 has 512 GB of storage space, then L2P bitmaps of 16 KB would be required.

Because the L2P tables are flushed to the particular VB on the dice after closure of the L2B tables, it is more difficult, and performance degrading, to update the L2P tables when writing to the VB after generation of the original L2P tables. Thus, the controller 115 may create virtual block (VB) bitmaps to be able to effectively track updates to the L2P tables via dynamically updating a corresponding L2P bitmap. A VB bitmap (of the VB bitmaps 160) can be understood as a mask of bits for a respective L2P table. This mask of bits may identify VBs to which at least one virtual page in the respective L2P points.

TABLE 2

| VB_N | VB_N-1 | ... | ... | VB_2 | VB_1 | VB_0 |
|---|---|---|---|---|---|---|
| 1 | 0 | ... | ... | 1 | 0 | 1 |

An example of a VB bitmap is illustrated in Table 2, where each entry represents a sequentially-number virtual block (VB) (e.g., VB_0, VB_1, VB_2, ... VB_N−1, VB_N). Each entry is either a zero ("0") bit value or a one ("1") bit value, where a one bit value indicates that the respective L2P table has at least one entry that maps a logical address to a physical address located within the identified VB. In these embodiments, it may not be necessary to store the VB bitmaps to the dice (e.g., within the NAND), but may be sufficient to buffer the VB bitmaps in the local memory 119 where the VB bitmaps can be continuously updated in real time after an update or checkpoint procedure. This may be possible by keeping the VB bitmaps small, e.g., between 4-8 KB, and avoids the need to continuously update L2P bitmaps after the checkpoint procedures.

In at least some embodiments, the controller 115 stores the L2P bitmap for the respective virtual block in the volatile memory (e.g., the local memory 119), while updating at least one of the respective L2P tables pertaining to the L2P bitmap. In response to closing a respective L2P table, the controller 115 can flush the respective L2P table to the memory device. And, in response to closing the L2P bitmap, the controller can store the L2P bitmap within the respective virtual block of the memory device.

Figure 2:
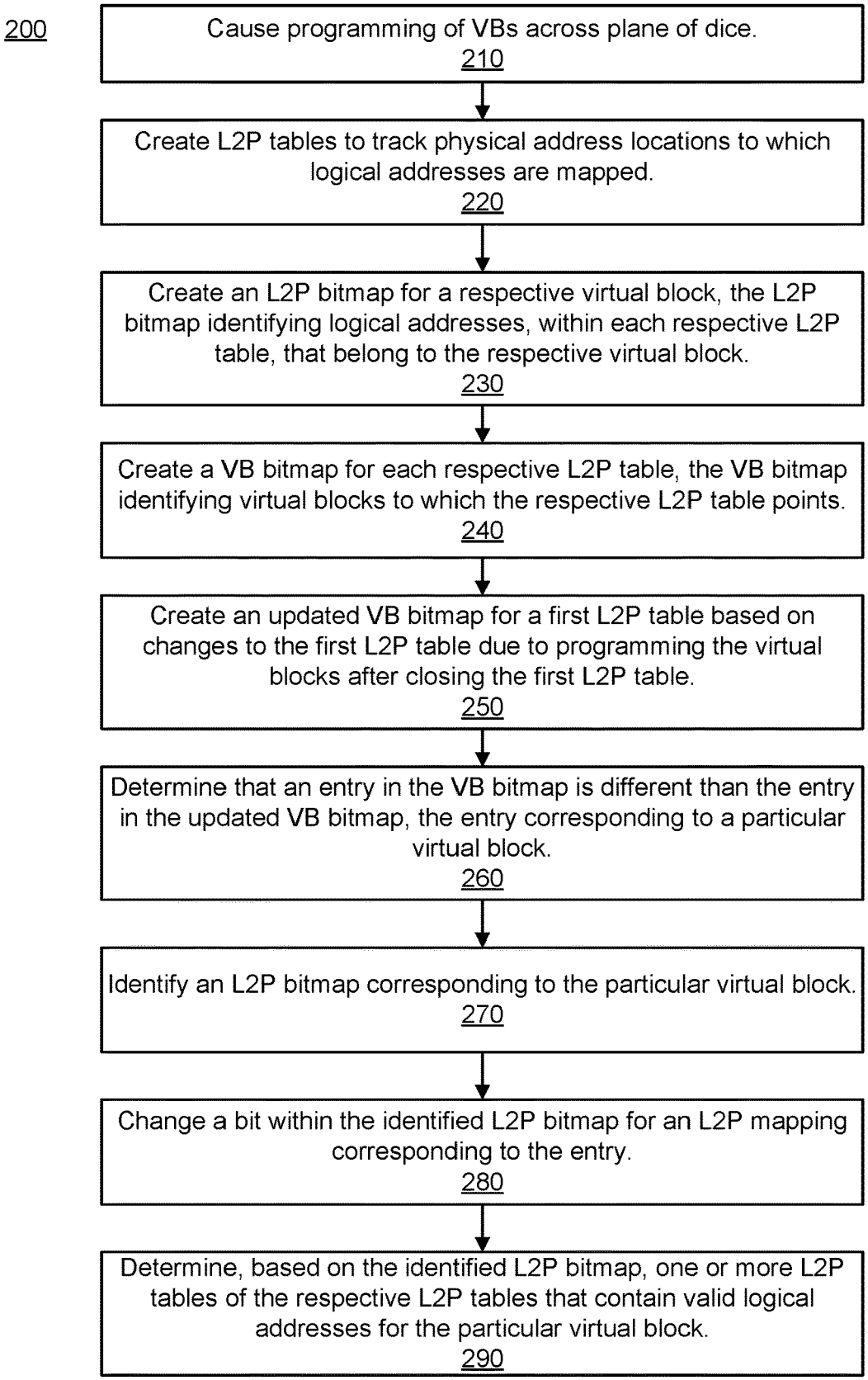
FIG. 2 is a flow diagram of an example method of dynamically updating a virtual block bitmap to dynamically update L2P bitmap(s), in accordance with some embodiments.

FIG. 2 is a flow diagram of an example method 200 of dynamically updating a virtual block bitmap to dynamically update L2P bitmap(s), in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the dynamic bitmap tracker 113 of FIGS. 1A-1B. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 210, virtual blocks (VBs) are programmed. More specifically, the processing logic causes programming of virtual blocks across planes of multiple dice of a memory device.

At operation 220, L2P tables are created. More specifically, the processing logic creates logical-to-physical address translation (L2P) tables to track physical address locations to which logical addresses are mapped.

At operation 230, an L2P bitmap is created. More specifically, the processing logic creates an L2P bitmap for a respective virtual block. In at least some embodiments, the L2P bitmap identifies logical addresses, within each respective L2P table, that belong to the respective virtual block.

At operation 240, a VB bitmap is created. More specifically, the processing logic creates a virtual block (VB) bitmap for each respective L2P table, the VB bitmap identifying virtual blocks to which the respective L2P table points.

At operation 250, an updated VB bitmap is created. More specifically, the processing logic creates an updated VB bitmap for a first L2P table based on changes to the first L2P table due to programming the virtual blocks after closing the first L2P table.

At operation 260, a comparison between VB bitmaps is performed. More specifically, the processing logic determines that an entry in the VB bitmap is different than the entry in the updated VB bitmap, the entry corresponding to a particular virtual block. In at least one embodiment, determining that the entry in the VB bitmap is different than the entry in the updated VB bitmap includes performing an exclusive OR of the VB bitmap of the first L2P table and the updated VB bitmap of the first L2P table.

At operation 270, an L2P bitmap is identified. More specifically, the processing logic identifies an L2P bitmap corresponding to the particular virtual block.

At operation 280, a bit in the identified L2P bitmap is changed. More specifically, the processing logic changes a bit within the identified L2P bitmap for an L2P mapping corresponding to the entry. For example, if the entry has been reset in the VB bitmap (1→0), processing logic resets a bit in an entry of the identified L2P bitmap corresponding to the virtual block. Further, if the entry has been set in the VB bitmap (0→1), the processing logic sets a bit in an entry of the identified L2P bitmap corresponding to the virtual block.

At operation 290, L2P table(s) are determined. More specifically, the processing logic employs the identified L2P bitmap to determine one or more L2P tables of the respective L2P tables that contain valid logical addresses for the particular virtual block. This information can then be used to access the one or more L2P tables to identify and update related mappings in the L2P table(s) based on a media management operation (see FIG. 4).

Figure 3A:
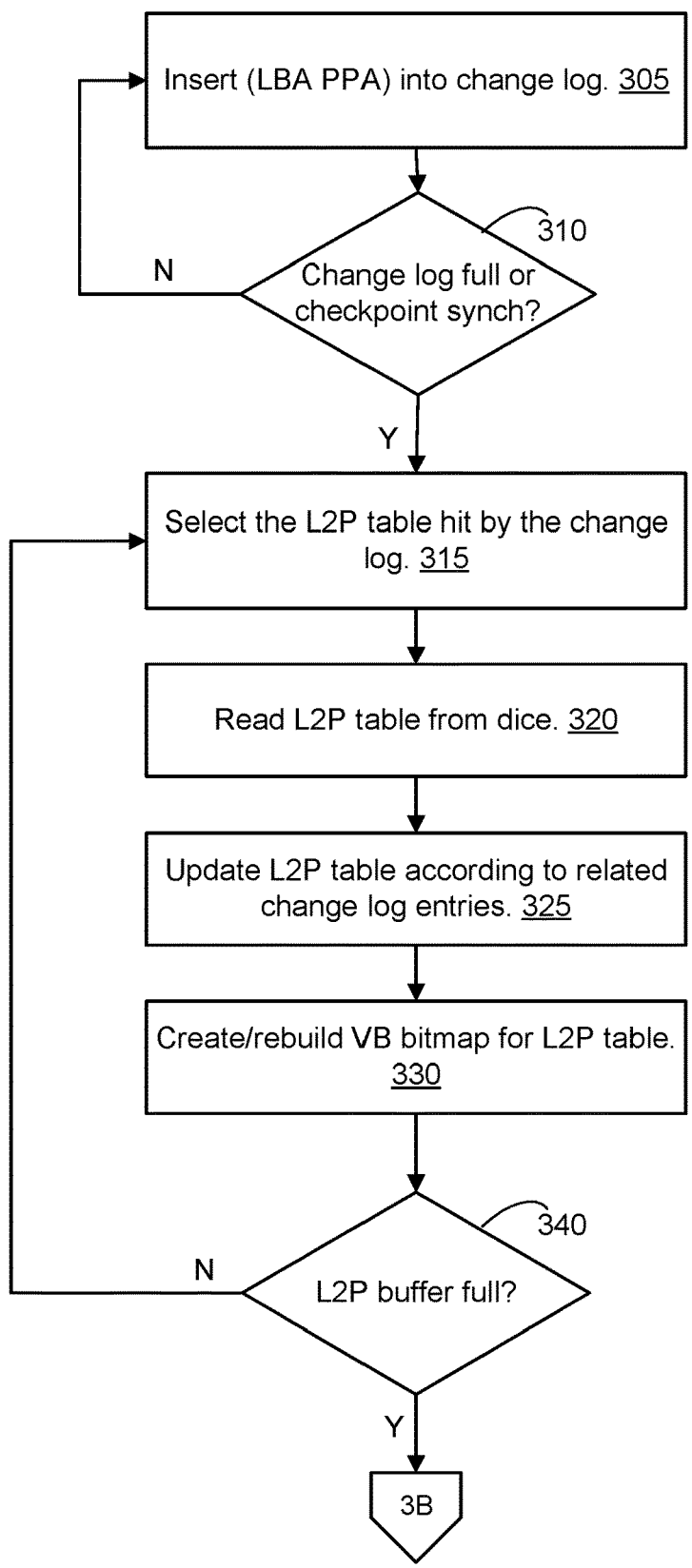
FIG. 3A is a flow diagram of an example method of updating an L2P table and creating a virtual block (VB) bitmap for the L2P table, in accordance with some embodiments.

FIG. 3A is a flow diagram of an example method 300A of updating an L2P table and creating a virtual block (VB) bitmap for the L2P table, in accordance with some embodiments. The method 300A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300A is performed by the dynamic bitmap tracker 113 of FIGS. 1A-1B. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 305, a logical address and physical address are inserted into a change log. More specifically, as programming proceeds, the processing logic inserts or buffers, into a change log stored in volatile memory, each logical address corresponding to a physical address to which data from the logical address is stored or written. In this way, buffering of L2P mappings can be performed during programming in this change log or a similar queue or buffer. In these embodiments, the volatile memory is the local memory 119 discussed earlier.

At operation 310, the change log is monitored. More specifically, the processing logic determines whether the change log is full or whether the firmware has reached a checkpoint synchronization point. If not, the method 300A loops back to operation 305. In response to the change log filling up or to detecting a checkpoint synchronization command, for each entry in the change log, the processing logic can perform operations 315 through 330 while there is still room in an L2P buffer in the volatile memory At operation 315, entries in the change log are processed. More specifically, the processing logic selects a L2P table hit by an entry in the change log.

At operation 320, the L2P table is read from the dice of the memory device 130. More specifically, the processing logic reads an L2P table, which is affected by the entry, into an L2P table buffer of the volatile memory.

At operation 325, the L2P table is updated. More specifically, the processing logic updates the L2P table based on the entry in the change log.

At operation 330, a VB bitmap is created. More specifically, the processing logic one of creates or rebuilds a VB bitmap for the updated L2P table.

At operation 340, the L2P buffer is monitored. More specifically, the processing logic detects whether the L2P table buffer of the volatile memory has become full of the updated L2P tables. If no, the method 300A loops back to operation 315 and continues to process entries of the change log. The change log entries may be processed sequentially, e.g., in a first-in-first-out fashion. If yes at operation 340, the method 300A transitions to method 300B.

Figure 3B:
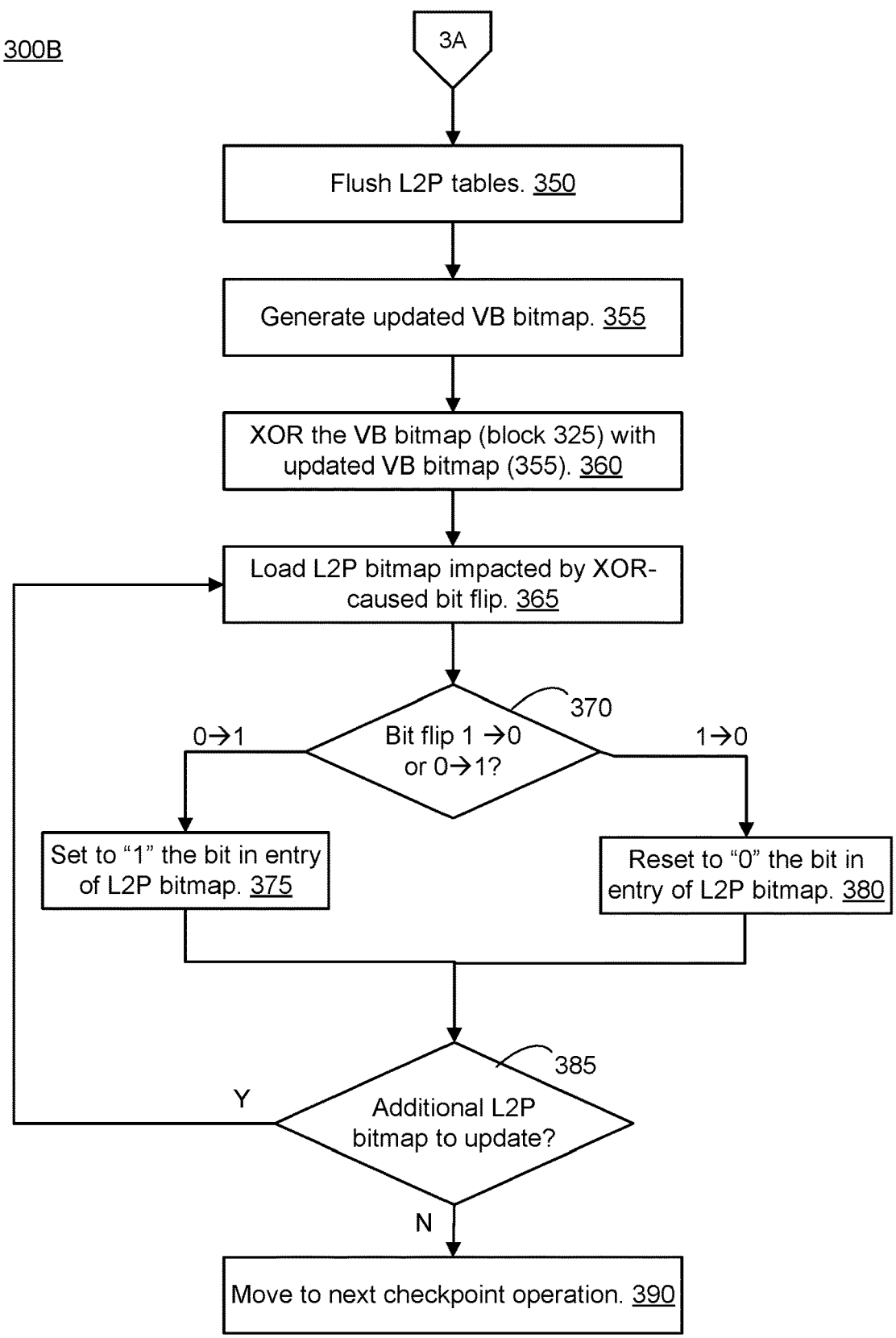
FIG. 3B is a flow diagram of an example method of comparing an updated VB bitmap with the VB bitmap to determine how to update one or more L2P tables that are to be used in media management, in accordance some embodiments.

FIG. 3B is a flow diagram of an example method 300B of comparing an updated VB bitmap with the VB bitmap to determine how to update one or more L2P tables that are to be used in media management, in accordance some embodiments. The method 300B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300B is performed by the dynamic bitmap tracker 113 of FIGS. 1A-1B. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 350, the updated L2P tables are flushed. More specifically, the processing logic flushes the updated L2P tables from the buffer of the volatile memory to the memory device 130, e.g., a designated VB of the NAND dice of the memory device 130.

At operation 355, an updated VB bitmap is generated. More specifically, the processing logic generates an updated VB bitmap for each updated L2P table that was flushed.

At operation 360, the VB bitmap and the updated VB bitmap are combined. More specifically, the processing logic performs an exclusive OR operation between the VB bitmap and the updated VB bitmap for each respective L2P table that was flushed to determine one or more entries, corresponding to respective virtual blocks, in the VB bitmap that have flipped values within the updated VB bitmap. Although an XOR is referenced herein, other Boolean or logical operations could also be employed to detect such bit flips.

At operation 365, each impacted L2P bitmap is loaded into the volatile memory. More specifically, the processing logic iteratively loads, into the volatile memory, the respective L2P bitmap corresponding to an identified virtual block of the one or more virtual blocks that is impacted by the bit flip.

TABLE 3

| After | Before | Value |
| --- | --- | --- |
| 0 | 0 | VB is not impacted by L2P table flush & L2P updates (no change). |
| 0 | 1 | VB is impacted by L2P table flush & L2P updates. This L2P table no longer points to a virtual page in that VB. Need to reset the bit (to zero) in L2P bitmap. |
| 1 | 0 | VB is impacted by L2P table flush & L2P updates. Need to set the bit (to one) in L2P bitmap. |
| 1 | 1 | VB is not impacted by L2P table flush & L2P updates (no change). |

At operation 370, a bit flip is determined. More specifically, at operation 370, the processing logic determines whether the bit flip is from a one value to a zero value (1→0) or from a zero value to a one value (0→1). If the entry has been set in the respective VB bitmap (0→1), at operation 375, the processing logic sets a bit in an entry of the respective L2P bitmap corresponding to the identified virtual block. If the entry has been reset in the respective VB bitmap (1→0), at operation 380, the processing logic resets a bit in an entry of the respective L2P bitmap corresponding to the identified virtual block. Table 3 illustrates a summary of the results based on if values in the original VB bitmap are "before" and the values in the updated VB bitmap are "after."

At operation 385, additional L2P bitmaps are loaded. More specifically, if additional L2P bitmaps were impacted by a bit-flip, at operation 365 the processing logic iteratively loads another L2P bitmap into volatile memory to be updated. Operation 370 and one of operation 375 or 380 is then performed as the impacted L2P bitmaps are iteratively updated.

At operation 390, the method 300B moves to a next checkpoint operation. More specifically, if, at operation 385, there are no more impacted L2P bitmaps to updated, the processing logic moves to a next checkpoint operation.

To illustrate the operations of the methods 300A and 300B, for purposes of explanation, a simplified example is presented herein below. Presume that on a particular memory device there are eight L2P tables and the host has already written the VB0 and VB1 and is now writing the data to VB2, and an L2P_2 table for VB2 is currently 0001111. Thus, the open cursor is located within the VB2 virtual block. On VB0, the host has written LBAs belonging to the L2P_0 table, the L2P_2 table, the L2P_4 table, and the L2P_7 table, for which an L2P_0 bitmap is created as: 10010101. On VB1 the host has written LBAs belonging to the L2P_0 table, the L2P_2 table, the L2P_4 table, the L2P_5 table, the L2P_6 table, and the L2P_7 table, for which an L2P_1 bitmap is created as 11110101. While writing the data to VB2, all of the LBAs belonging to the L2P_0 table, the L2P_1 table, the L2P_2 table, and the L2P_3 table are updated.

Based on these write operations at the multiple dice, the controller 115 generates the following VB bitmaps for the L2P_0 table, the L2P_1 table, the L2P_2 table, and the L2P_3 table, illustrated in Table 4, Table 5, Table 6, and Table 7, respectively.

TABLE 4

|  | VB7 | VB6 | VB5 | VB4 | VB3 | VB2 | VB1 | VB0 |
|---|---|---|---|---|---|---|---|---|
| Before | 0 | 0 | 0 | 0 | 0 | 0 | 1 | 1 |
| After | 0 | 0 | 0 | 0 | 0 | 1 | 0 | 0 |

TABLE 5

|  | VB7 | VB6 | VB5 | VB4 | VB3 | VB2 | VB1 | VB0 |
|---|---|---|---|---|---|---|---|---|
| Before | 0 | 0 | 0 | 0 | 0 | 0 | 0 | 0 |
| After | 0 | 0 | 0 | 0 | 0 | 1 | 0 | 0 |

TABLE 6

|  | VB7 | VB6 | VB5 | VB4 | VB3 | VB2 | VB1 | VB0 |
|---|---|---|---|---|---|---|---|---|
| Before | 0 | 0 | 0 | 0 | 0 | 0 | 1 | 1 |
| After | 0 | 0 | 0 | 0 | 0 | 1 | 0 | 0 |

TABLE 7

|  | VB7 | VB6 | VB5 | VB4 | VB3 | VB2 | VB1 | VB0 |
|---|---|---|---|---|---|---|---|---|
| Before | 0 | 0 | 0 | 0 | 0 | 0 | 0 | 0 |
| After | 0 | 0 | 0 | 0 | 0 | 1 | 0 | 0 |

The other L2P tables are not involved in the VB2 updating, so it is not necessary to reevaluate the corresponding VB bitmaps. Based on the above VB bitmaps, the controller 115 can update the L2P_0 bitmap, L2P_1 bitmap, and L2P2 bitmap as follows, illustrated as Table 8, Table 9, and Table 10, respectively.

TABLE 8

| L2P_7 | L2P_6 | L2P_5 | L2P_4 | L2P_3 | L2P_2 | L2P_1 | L2P_0 |
|---|---|---|---|---|---|---|---|
| 1 | 0 | 0 | 1 | 0 | 0 | 0 | 0 |

TABLE 9

| L2P_7 | L2P_6 | L2P_5 | L2P_4 | L2P_3 | L2P_2 | L2P_1 | L2P_0 |
|---|---|---|---|---|---|---|---|
| 1 | 1 | 1 | 1 | 0 | 0 | 0 | 0 |

TABLE 10

| L2P_7 | L2P_6 | L2P_5 | L2P_4 | L2P_3 | L2P_2 | L2P_1 | L2P_0 |
|---|---|---|---|---|---|---|---|
| 0 | 0 | 0 | 0 | 1 | 1 | 1 | 1 |

As consequence on VB0, only the LBAs belonging to the L2P_4 table and the L2P_7 table will be still valid. On VB1, only the LBAs belonging to the L2P_4 table, the L2P_5 table, the L2P_6 table, and the L2P_7 table will be valid. Finally, for VB2, the valid LBAs belong to the L2P_3 table, the L2P_2 table, the L2P_1 table, and the L2P_0 table.

Figure 4:
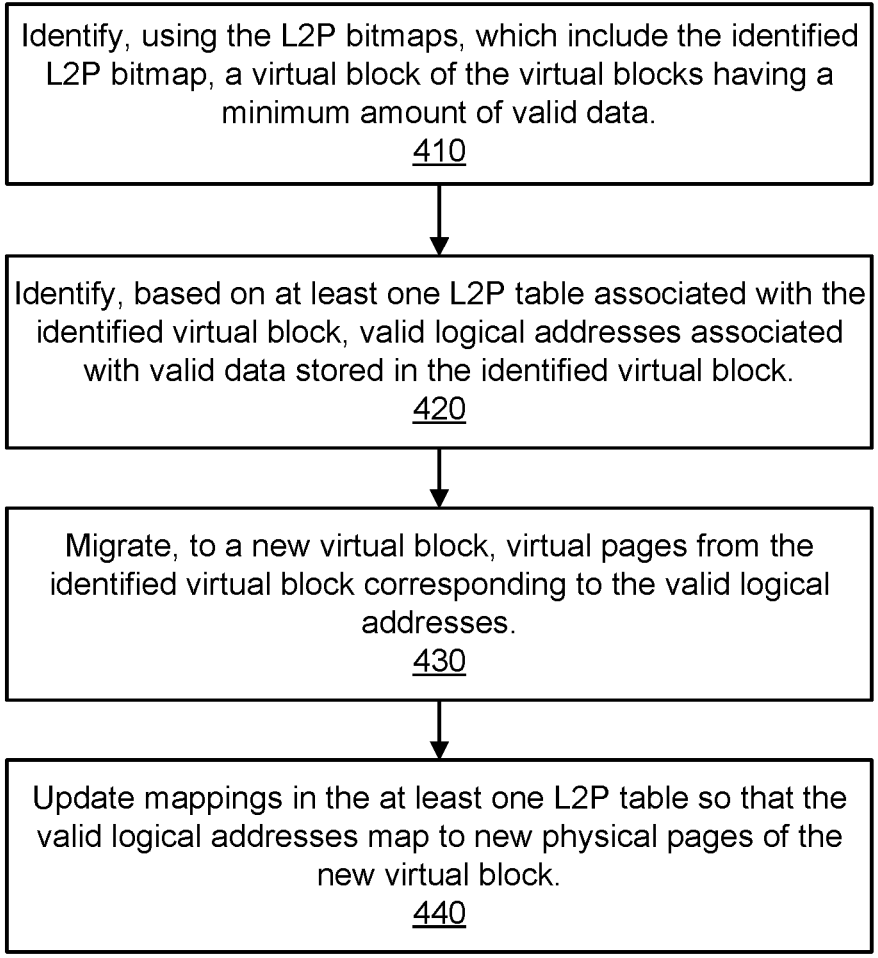
FIG. 4 is a flow diagram of an example method of performing media management with updated mappings retrieved from updated L2P table(s), in accordance some embodiments.

FIG. 4 is a flow diagram of an example method 400 of performing media management with updated mappings retrieved from updated L2P table(s), in accordance some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the dynamic bitmap tracker 113 and/or the controller 115 of FIGS. 1A-1B. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

In at least some embodiments, creating each L2P bitmap is performed after the respective virtual block has been closed. At operation 410, a virtual block (VB) is identified. More specifically, the processing logic identifies, using the L2P bitmaps, which include the identified L2P bitmap from operation 290 (FIG. 2), a virtual block of the virtual blocks having a minimum amount of valid data.

At operation 420, valid logical addresses are identified. More specifically, the processing logic identifies, based on at least one L2P table associated with the identified virtual block, valid logical addresses associated with valid data stored in the identified virtual block.

At operation 430, data is migrated to a new virtual block. More specifically, the processing logic migrates, to a new virtual block, virtual pages from the identified virtual block corresponding to the valid logical addresses.

At operation 440, L2P mappings are updated. More specifically, the processing logic updates mappings in the at least one L2P table so that the valid logical addresses map to new physical pages of the new virtual block. The updated at least one L2P table can then be flushed back to multiple dice of the memory device 130.

Figure 5:
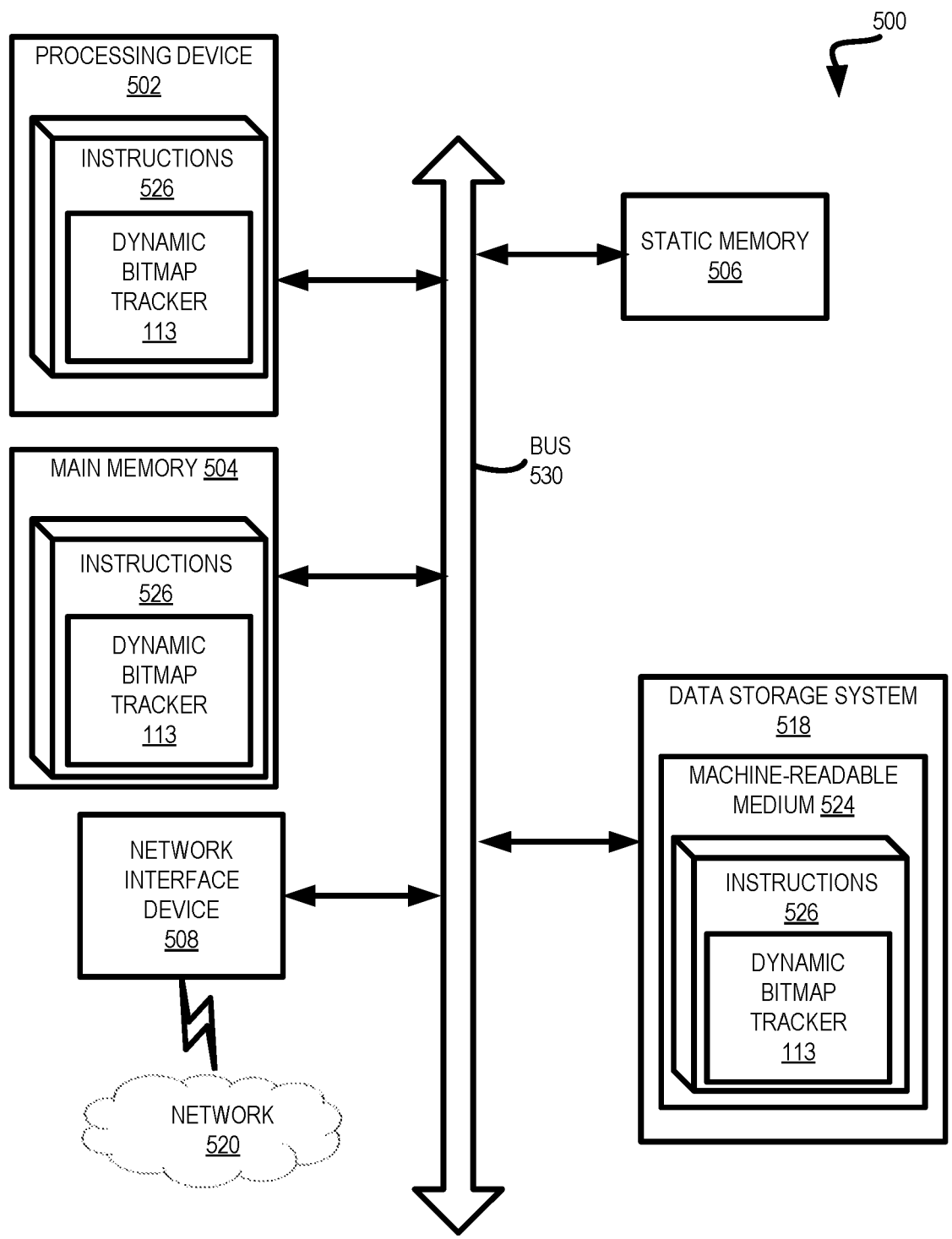
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the dynamic bitmap tracker 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 510 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 528 for performing the operations and steps discussed herein. The computer system 500 can further include a network interface device 512 to communicate over the network 520.

The data storage system 518 can include a machine-readable storage medium 524 (also known as a computer-readable medium) on which is stored one or more sets of instructions 528 or software embodying any one or more of the methodologies or functions described herein. The instructions 528 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1A.

In one embodiment, the instructions 528 include instructions to implement functionality corresponding to the dynamic bitmap tracker 113 of FIG. 1A. While the machine-readable storage medium 524 is shown in an example embodiment to be a single medium, the term "machine-readable storage medium" or "non-transitory computer-readable storage medium" should be taken to include a single medium or multiple media that store the one or more sets of instructions. The term "machine-readable storage medium" or "non-transitory computer-readable storage medium" shall also be taken to include any medium that is capable of storing or encoding a set of instructions for execution by the machine and that cause the machine to perform any one or more of the methodologies of the present disclosure. The term "machine-readable storage medium" or "non-transitory computer-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device comprising multiple dice; and
   a processing device coupled to the memory device, the processing device to perform operations comprising:
   creating a logical-to-physical address translation (L2P) bitmap for each respective virtual block programmed across a plane of the multiple dice, each L2P bitmap identifying logical addresses, within each respective L2P table of a plurality of L2P tables, that belong to a respective virtual block;
   creating a virtual block (VB) bitmap for each respective L2P table, the VB bitmap identifying virtual blocks to which the respective L2P table points;
   creating an updated VB bitmap for a first L2P table, of the plurality of L2P tables, based on changes to the first L2P table;
   determining that an entry in the VB bitmap is different than the entry in the updated VB bitmap, the entry corresponding to a particular virtual block; and
   identifying and updating an L2P bitmap associated with the particular virtual block for an L2P mapping corresponding to the entry.

2. The system of claim 1, wherein the operations further comprise:
   changing a bit within the identified L2P bitmap for an L2P mapping corresponding to the entry; and
   determining, based on the identified L2P bitmap, one or more L2P tables of the respective L2P tables that contain valid logical addresses for the particular virtual block.

3. The system of claim 1, further comprising a volatile memory coupled to the processing device, the operations further comprising:
   storing the L2P bitmap for the respective virtual block in the volatile memory while updating at least one of the respective L2P tables;
   in response to closing a respective L2P table, flushing the respective L2P table to the memory device; and
   in response to closing the L2P bitmap, storing the L2P bitmap within the respective virtual block of the memory device.

4. The system of claim 1, further comprising a volatile memory coupled to the processing device, wherein the creating the L2P bitmap is performed after the respective virtual block has been closed, and wherein, to perform a media management operation, the operations further comprise:
   identifying, using the L2P bitmaps, which include the identified L2P bitmap, a virtual block of the virtual blocks having a minimum amount of valid data;
   identifying, based on at least one L2P table associated with the identified virtual block, valid logical addresses associated with valid data stored in the identified virtual block;
   migrating, to a new virtual block, virtual pages from the identified virtual block corresponding to the valid logical addresses; and
   updating mappings in the at least one L2P table so that the valid logical addresses map to new physical pages of the new virtual block.

5. The system of claim 1, further comprising a volatile memory coupled to the processing device, wherein the operations further comprise:
   inserting, into a change log stored in the volatile memory, each logical address corresponding to a physical address to which data from the logical address is stored; and
   in response to the change log filling up or to detecting a checkpoint synchronization command, for each entry in the change log:
      reading an L2P table, which is affected by the entry, into an L2P table buffer of the volatile memory;
      updating the L2P table based on the entry; and
      one of creating or rebuilding the VB bitmap for the updated L2P table;
   detecting the L2P table buffer has become full of the updated L2P tables;
   flushing the updated L2P tables to the memory device;
   generating an updated VB bitmap for each updated L2P table that was flushed; and
   performing a logical operation between the VB bitmap and the updated VB bitmap for each respective L2P table that was flushed to determine one or more entries, corresponding to respective virtual blocks, in the VB bitmap that have flipped values within the updated VB bitmap.

6. The system of claim 1, wherein
   determining that the entry in the VB bitmap is different than the entry in the updated VB bitmap comprises performing an exclusive OR of the VB bitmap of the first L2P table and the updated VB bitmap of the first L2P table; and
   changing a bit within the identified L2P bitmap comprises one of:
      if the entry has been reset in the VB bitmap, resetting a bit in an entry of the identified L2P bitmap corresponding to the virtual block; and
      if the entry has been set in the VB bitmap, setting a bit in an entry of the identified L2P bitmap corresponding to the virtual block.

7. The system of claim 1, further comprising a volatile memory coupled to the processing device, wherein the operations further comprise:
   creating an updated VB bitmap for each L2P table that has changed;

performing an exclusive OR operation between a respective VB bitmap and a respective updated VB bitmap for a respective L2P table that has changed to determine one or more entries, corresponding to one or more virtual blocks, in the respective VB bitmap that have flipped values within the respective updated VB bitmap;

iteratively loading, into the volatile memory, the respective L2P bitmap corresponding to an identified virtual block of the one or more virtual blocks, the L2P bitmap having changed according to an entry of the one or more entries;

if the entry has been reset in the respective VB bitmap, resetting a bit in an entry of the respective L2P bitmap corresponding to the identified virtual block; and if the entry has been set in the respective VB bitmap, setting a bit in an entry of the respective L2P bitmap corresponding to the identified virtual block.

8. The system of claim 1, further comprising a hardware logic coupled with the memory device and the processing device, the hardware logic to extract VB-based information related to mapping of the virtual blocks to specific L2P tables, the VB-based information to facilitate creating the VB bitmap and the updated VB bitmap.

9. A method comprising:

creating, by a processing device, a logical-to-physical address translation (L2P) bitmap for each respective virtual block programmed across a plane of multiple dice of a memory device, each L2P bitmap identifying logical addresses, within each respective L2P table of a plurality of L2P tables, that belong to a respective virtual block;

creating a virtual block (VB) bitmap for each respective L2P table, the VB bitmap identifying virtual blocks to which the respective L2P table points;

creating an updated VB bitmap for a first L2P table, of the plurality of L2P tables, based on changes to the first L2P table;

determining that an entry in the VB bitmap is different than the entry in the updated VB bitmap, the entry corresponding to a particular virtual block; and identifying and updating, by the processing device, an L2P bitmap associated with the particular virtual block for an L2P mapping corresponding to the entry.

10. The method of claim 9, further comprising:

changing a bit within the identified L2P bitmap for an L2P mapping corresponding to the entry; and employing the identified L2P bitmap to determine one or more L2P tables of the respective L2P tables that contain valid logical addresses for the particular virtual block.

11. The method of claim 9, further comprising:

storing the L2P bitmap for the respective virtual block in volatile memory while updating at least one of the respective L2P tables;

in response to closing a respective L2P table, flushing the respective L2P table to the memory device; and in response to closing the L2P bitmap, storing the L2P bitmap within the respective virtual block of the memory device.

12. The method of claim 9, wherein the creating the L2P bitmap is performed after the respective virtual block has been closed, and wherein, to perform a media management operation, the method further comprises:

identifying, using the L2P bitmaps, which include the identified L2P bitmap, a virtual block of the virtual blocks having a minimum amount of valid data;

identifying, based on at least one L2P table associated with the identified virtual block, valid logical addresses associated with valid data stored in the identified virtual block;

migrating, to a new virtual block, virtual pages from the identified virtual block corresponding to the valid logical addresses; and updating mappings in the at least one L2P table so that the valid logical addresses map to new physical pages of the new virtual block.

13. The method of claim 9, further comprising:

inserting, into a change log stored in volatile memory, each logical address corresponding to a physical address to which data from the logical address is stored; and in response to the change log filling up or to detecting a checkpoint synchronization command, for each entry in the change log:

reading an L2P table, which is affected by the entry, into an L2P table buffer of the volatile memory;

updating the L2P table based on the entry; and one of creating or rebuilding the VB bitmap for the updated L2P table;

detecting the L2P table buffer has become full of the updated L2P tables;

flushing the updated L2P tables to the memory device;

generating an updated VB bitmap for each updated L2P table that was flushed; and performing a logical operation between the VB bitmap and the updated VB bitmap for each respective L2P table that was flushed to determine one or more entries, corresponding to respective virtual blocks, in the VB bitmap that have flipped values within the updated VB bitmap.

14. The method of claim 9, wherein determining that the entry in the VB bitmap is different than the entry in the updated VB bitmap comprises performing an exclusive OR of the VB bitmap of the first L2P table and the updated VB bitmap of the first L2P table; and changing a bit within the identified L2P bitmap comprises one of:

if the entry has been reset in the VB bitmap, resetting a bit in an entry of the identified L2P bitmap corresponding to the virtual block; and if the entry has been set in the VB bitmap, setting a bit in an entry of the identified L2P bitmap corresponding to the virtual block.

15. The method of claim 9, further comprising:

creating an updated VB bitmap for each L2P table that has changed;

performing an exclusive OR operation between a respective VB bitmap and a respective updated VB bitmap for a respective L2P table that has changed to determine one or more entries, corresponding to one or more virtual blocks, in the respective VB bitmap that have flipped values within the respective updated VB bitmap;

iteratively loading, into volatile memory, the respective L2P bitmap corresponding to an identified virtual block of the one or more virtual blocks, the L2P bitmap having changed according to an entry of the one or more entries;

if the entry has been reset in the respective VB bitmap, resetting a bit in an entry of the respective L2P bitmap corresponding to the identified virtual block; and if the entry has been set in the respective VB bitmap, setting a bit in an entry of the respective L2P bitmap corresponding to the identified virtual block.

16. The method of claim 9, further comprising extracting, using hardware logic of the memory device, VB-based information related to mapping of the virtual blocks to specific L2P tables, the VB-based information to facilitate creating of the VB bitmap and the updated VB bitmap.

17. A non-transitory computer-readable storage medium storing instructions, which when executed by a processing device of a memory sub-system of a memory device, causes the processing device to perform operations comprising:
creating a logical-to-physical address translation (L2P) bitmap for each respective virtual block programmed across a plane of multiple dice of the memory device, each L2P bitmap identifying logical addresses, within each respective L2P table of a plurality of L2P tables, that belong to a respective virtual block;
creating a virtual block (VB) bitmap for each respective L2P table, the VB bitmap identifying virtual blocks to which the respective L2P table points;
creating an updated VB bitmap for a first L2P table, of the plurality of L2P tables, based on changes to the first L2P table;
determining that an entry in the VB bitmap is different than the entry in the updated VB bitmap, the entry corresponding to a particular virtual block; and
identifying and updating, by the processing device, an L2P bitmap associated with the particular virtual block for an L2P mapping corresponding to the entry.

18. The non-transitory computer-readable storage medium of claim 17, wherein the operations further comprise:
storing the L2P bitmap for the respective virtual block in volatile memory while updating at least one of the respective L2P tables;
in response to closing a respective L2P table, flushing the respective L2P table to the memory device; and
in response to closing the L2P bitmap, storing the L2P bitmap within the respective virtual block of the memory device.

19. The non-transitory computer-readable storage medium of claim 17, wherein the operations further comprise:
inserting, into a change log stored in volatile memory, each logical address corresponding to a physical address to which data from the logical address is stored; and
in response to the volatile memory filling up or to detecting a checkpoint synchronization command, for each entry in the change log:
reading an L2P table, which is affected by the entry, into an L2P table buffer of the volatile memory;
updating the L2P table based on the entry; and
one of creating or rebuilding the VB bitmap for the updated L2P table.

20. The non-transitory computer-readable storage medium of claim 17, wherein
determining that the entry in the VB bitmap is different than the entry in the updated VB bitmap comprises performing a logical operation between the VB bitmap of the first L2P table and the updated VB bitmap of the first L2P table; and
changing a bit within the identified L2P bitmap comprises one of:
if the entry has been reset in the VB bitmap, resetting a bit in an entry of the identified L2P bitmap corresponding to the virtual block; and
if the entry has been set in the VB bitmap, setting a bit in an entry of the identified L2P bitmap corresponding to the virtual block.

\* \* \* \* \*